(12) United States Patent
Tang

(10) Patent No.: US 11,172,476 B2
(45) Date of Patent: Nov. 9, 2021

(54) SIGNAL PROCESSING METHOD AND APPARATUS

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/662,780

(22) Filed: Oct. 24, 2019

(65) Prior Publication Data

US 2020/0059913 A1 Feb. 20, 2020

Related U.S. Application Data

(63) Continuation of application No. PCT/CN2017/081860, filed on Apr. 25, 2017.

(51) Int. Cl.
| | | |
|---|---|---|
| *H04W 72/04* | (2009.01) | |
| *H04W 76/11* | (2018.01) | |
| *H04L 1/00* | (2006.01) | |
| *H04L 5/00* | (2006.01) | |
| *H04L 5/10* | (2006.01) | |

(Continued)

(52) U.S. Cl.
CPC ......... *H04W 72/042* (2013.01); *H04L 1/0026* (2013.01); *H04L 5/0051* (2013.01); *H04L 5/10* (2013.01); *H04W 56/001* (2013.01); *H04W 72/005* (2013.01); *H04W 76/11* (2018.02)

(58) Field of Classification Search
None
See application file for complete search history.

(56) References Cited

U.S. PATENT DOCUMENTS

| | | | | |
|---|---|---|---|---|
| 10,505,773 | B2 * | 12/2019 | Sadiq | ............... H04L 27/2613 |
| 2013/0279437 | A1 * | 10/2013 | Ng | ..................... H04W 48/12 |
| | | | | 370/329 |

(Continued)

FOREIGN PATENT DOCUMENTS

| | | | |
|---|---|---|---|
| CN | 104106223 A | 10/2014 | |
| CN | 104247291 A | 12/2014 | |

(Continued)

OTHER PUBLICATIONS

International Search Report in the international application No. PCT/CN2017/081860, dated Jan. 29, 2018.

(Continued)

*Primary Examiner* — Otis L Thompson, Jr.

(57) ABSTRACT

The embodiments of the application provide a signal processing method and device, which may find a second downlink signal in Quasi-Co-Location (QCL) with a first downlink signal through a QCL Identifier (ID), thereby processing the first downlink signal based on the second downlink signal. The method includes that: a terminal device determines a QCL ID corresponding to a first port set for a first downlink signal; the UE determines a second downlink signal in QCL with the first port set for the first downlink signal based on the QCL ID; and the UE processes a signal on the first port set for the first downlink signal based on QCL information obtained from the second downlink signal.

16 Claims, 2 Drawing Sheets

(51) Int. Cl.
*H04W 56/00* (2009.01)
*H04W 72/00* (2009.01)

(56) References Cited

U.S. PATENT DOCUMENTS

| | | | |
|---|---|---|---|
| 2015/0029966 A1* | 1/2015 | Park | H04L 5/0014 370/329 |
| 2015/0201369 A1 | 7/2015 | Ng et al. | |
| 2015/0257130 A1 | 9/2015 | Lee et al. | |
| 2015/0349855 A1 | 12/2015 | Sesia et al. | |
| 2016/0142189 A1 | 5/2016 | Shin et al. | |
| 2016/0270100 A1* | 9/2016 | Ng | H04L 1/1887 |
| 2016/0294514 A1* | 10/2016 | Tang | H04W 4/70 |
| 2017/0105112 A1* | 4/2017 | Park | H04L 5/0048 |
| 2017/0288743 A1* | 10/2017 | Nam | H04B 7/024 |
| 2018/0054797 A1* | 2/2018 | Islam | H04B 7/0617 |
| 2018/0145809 A1* | 5/2018 | Kwak | H04L 5/0048 |
| 2018/0167946 A1* | 6/2018 | Si | H04W 72/0486 |
| 2018/0205585 A1* | 7/2018 | Sadiq | H04B 7/0695 |
| 2018/0241605 A1* | 8/2018 | Luo | H04L 5/0044 |
| 2018/0262313 A1* | 9/2018 | Nam | H04W 72/0446 |
| 2018/0269950 A1* | 9/2018 | Wilson | H04B 17/21 |
| 2018/0278467 A1* | 9/2018 | Wilson | H04W 72/0413 |
| 2018/0279145 A1* | 9/2018 | Jung | H04W 36/0085 |
| 2018/0279152 A1* | 9/2018 | Kim | H04W 24/10 |
| 2018/0323830 A1* | 11/2018 | Park | H04B 7/024 |
| 2019/0052502 A1* | 2/2019 | Ren | H04B 7/26 |
| 2019/0098562 A1 | 3/2019 | Ng et al. | |
| 2019/0115955 A1* | 4/2019 | Wilson | H04W 76/27 |
| 2019/0140776 A1* | 5/2019 | Seo | H04L 5/0048 |
| 2019/0222289 A1* | 7/2019 | Wilson | H04B 7/0695 |
| 2019/0260425 A1* | 8/2019 | Ji | H04W 24/04 |
| 2019/0342905 A1* | 11/2019 | Ren | H04L 1/001 |
| 2019/0349051 A1* | 11/2019 | Sarkis | H04B 7/0626 |
| 2019/0349170 A1* | 11/2019 | Li | H04L 5/0053 |
| 2019/0349938 A1* | 11/2019 | Chen | H04W 72/042 |
| 2019/0357159 A1* | 11/2019 | Pan | H04W 56/001 |
| 2019/0363831 A1* | 11/2019 | Davydov | H04B 7/0626 |
| 2019/0364556 A1* | 11/2019 | Davydov | H04W 56/001 |
| 2019/0379431 A1 | 12/2019 | Park et al. | |
| 2019/0393972 A1* | 12/2019 | Pan | H04J 11/0073 |
| 2020/0022010 A1* | 1/2020 | Kim | H04W 24/02 |
| 2020/0044712 A1* | 2/2020 | Manolakos | H04L 1/0013 |
| 2020/0053633 A1 | 2/2020 | Ng et al. | |
| 2020/0112355 A1* | 4/2020 | Park | H04L 5/00 |

FOREIGN PATENT DOCUMENTS

| | | |
|---|---|---|
| CN | 104813602 A | 7/2015 |
| CN | 106559879 A | 4/2017 |
| EP | 2890024 A1 | 7/2015 |
| EP | 3471318 A1 | 4/2019 |
| JP | 2015515219 A | 5/2015 |
| KR | 20180089901 A | 8/2018 |

OTHER PUBLICATIONS

Written Opinion of the International Search Authority in the international application PCT/CN2017/081860, dated Jan. 29, 2018.
Nokia,"R1-1706797, Summary of AI 8.1.2.4.5 QCL", 3GPP TSG RAN WG1 88bis, Apr. 7, 2017 (Apr. 7, 2017).
Samsung,"R1-1700934, On QCL for NR", 3GPP TSG RAN WG1-NR, Jan. 20, 2017 (Jan. 20, 2017).
Huawei et al.,"R1-1700405, QCL Indication of Downlink Control Channel and Beam Management Reference Signals", 3GPP TSG RAN WG1 NR Ad Hoc Meeting, Jan. 20, 2017 (Jan. 20, 2017).
Ericsson,"R1-1705909, On QCL for DL RS", 3GPP TSG RAN WG1 #88bis, Apr. 7, 2017 (Apr. 7, 2017).
Sharp,"R1-125242, DCI Signalling in DCI Format 20 and Fallback Operation in TM10",3GPP TSG RAN WG1 Meeting#71, Nov. 16, 2012 (Nov. 16, 2012).
Huawei et al.,"R1-1704239, Details of QCL Assumptions and Related RS Design Considerations", 3GPP TSG RAN WG1 Meeting#88bis, Apr. 7, 2017 (Apr. 7, 2017).
LG Electronics : "Discussion on QCL for NR", 3GPP Draft; R1-1704893 NR_QCL_FINAL, 3rd Generation Partnership Project (3GPP), vol. RAN WG1, No. Spokane, USA; Apr. 3, 2017-Apr. 7, 2017 Apr. 2, 2017 (Apr. 2, 2017), XP051243028, Retrieved from the Internet: URL:http://www.3gpp.org/ftp/Meetings_3GPP_SYNC/RAN1/Docs/ [retrieved on Apr. 2, 2017] * the whole document*.
Supplementary European Search Report in the European application No. 17907401.8, dated Mar. 12, 2020.
First Office Action of the European application No. 17907401.8, dated Sep. 28, 2020.
First Office Action of the Chinese application No. 201911295874.3, dated Nov. 2, 2020.
Ericsson: "NR four-step random access procedure", 3GPP Draft; R1-1706015 NR Four_Step_Prach_Procedure, 3rd Generation Partnership Project (3GPP), Mobile Competence Centre; 650, Route Des Lucioles; F-06921 Sophia-Antipolis Cedex; France, vol. RAN WG1, No. Spokane, WA, USA; Apr. 3, 2017-Apr. 7, 2017 (Apr. 2, 2017), XP051244123.
Second Office Action of the European application No. 17907401.8, dated Feb. 22, 2021.
First Office Action of the Korean application No. 10-2019-7032767, dated Feb. 17, 2021.
Second Office Action of the Chilean application No. 201903052, dated Mar. 17, 2021.
Written Opinion of the Singaporean application No. 11201909953P, dated Apr. 13, 2021.
First Office Action of the Japanese application No. 2019-557550, dated Jun. 22, 2021.
3GPP TSG RAN WG1 Meeting #88 R1-1702466, Athens, Greece Feb. 13-17, 2017, Agenda item: 8.1.2.4.5, Source: LG Electronics, Title: Discussion on QCL for NR, Document for: Discussion and Decision.
3GPP TSG RAN WG1 Meeting #88bis R1-1705713, Spokane, USA, Apr. 3-7, 2017, Source: NTT Docomo, Inc. Title: Discussion on CSI-RS configuration for NR RRM measurement in CONNECTED mode, Agenda Item 8.1.1.5, Document for: Discussion and Decision.
Third Office Action of the European application No. 17907401.8, dated Jun. 28, 2021.
First Office Action of the Indian application No. 201917045656,dated Jun. 20, 2021.
3GPP TSG RAN WG1#88b R1-1705358, Spokane, USA, Apr. 3-7, 2017, Agenda item: 8.1.2.4.5, Source Samsung, Title: On DL QCL for NR, Document for: Discussion and Decision.
3GPP TSG RAN WG1 #88bis R1-1705596, Apr. 3-7, 2017, Spokane, USA, Agenda item: 8.1.2.4.5, Title Discussion on QCL, Document for: Discussion/Decision.
First Office Action of the Taiwanese application No. 107113657, dated Jul. 16, 2021.
3GPP TSG-RAN WG1 #87ah-NR R1-1700771, Spokane, WA, USA, Jan. 16-20, 2017, Source: Ericsson, Title: On spatial QCL definition, Agenda Item: 5.1.2.3.5, Document for: Discussion and Decision.
Notice of Rejection of the Korean application No. 10-2019-7032767, dated Aug. 30, 2021.
Second Office Action of the Canadian application No. 3061160, dated Sep. 7, 2021.

\* cited by examiner

SIGNAL PROCESSING METHOD AND APPARATUS

TECHNICAL FIELD

The application relates to the field of communication, and more particularly to a signal processing method and apparatus.

BACKGROUND

In a Long Term Evolution (LTE) system, the concept of Quasi-Co-Location (QCL) is introduced. In case of QCL of two downlink signals, one of the two downlink signals may be processed based on the other of the two downlink signals. For example, channel estimation may be performed on a channel for transmitting one of the two downlink signals based on a large scale property obtained by channel estimation over a channel for transmitting the other of the two downlink signals, thereby improving channel estimation performance of the downlink signal.

Therefore, how to find a downlink signal in QCL with another downlink signal so as to process signals on a first port set for the downlink signal based on the another downlink signal is a problem worth researching.

SUMMARY

Embodiments of the application provide a signal processing method and device, which may find a second reference signal (RS) in QCL with a first downlink signal through a QCL Identifier (ID), thereby processing a signal on a first port set for the first downlink signal based on the second downlink signal.

A first aspect provides a signal processing method, which may include that: a terminal device determines a QCL ID corresponding to a first port set for a first downlink signal; the UE determines a second downlink signal in QCL with the first port set for the first downlink signal based on the QCL ID; and the UE processes a signal on the first port set for the first downlink signal based on QCL information obtained from the second downlink signal.

In specific implementation, it may be set that ports in QCL correspond to the same QCL ID and the ports in QCL and other ports correspond to different QCL IDs respectively.

For example, if the first port set for the first downlink signal is in QCL with a second port set for the second downlink signal, the first port set for the first downlink signal and the second port set for the second downlink signal correspond to the same QCL ID, and then the UE may determine ports in QCL based on the QCL ID.

Alternatively, if the first downlink signal is a Demodulation reference signal (DMRS), the DMRS may be a DMRS of a data channel, namely the DMRS may be configured for related demodulation of the data channel, and it may also be a DMRS of a control channel, namely the DMRS may be configured for related demodulation of the control channel.

In combination with the first aspect, in some implementation modes of the first aspect, the QCL ID may be a cell ID, or a beam ID, or a time index of a synchronization signal (SS) block, or an RS ID configured to generate a sequence of a downlink RS.

In combination with the first aspect, in some implementation modes of the first aspect, the first port set may include part or all of ports for the first downlink signal.

In combination with the first aspect, in some implementation modes of the first aspect, the QCL ID may be the cell ID, and the operation that the UE determines the second downlink signal in QCL with the first port set for the first downlink signal based on the QCL ID may include the following operation.

The UE determines an SS block or signal in the SS block containing the cell ID as the second downlink signal in QCL with the first port set for the first downlink signal.

In combination with the first aspect, in some implementation modes of the first aspect, the QCL ID may be the time index of the SS block, and the operation that the UE determines the second downlink signal in QCL with the first port set for the first downlink signal based on the QCL ID may include the following operation.

The UE determines an SS block containing the time index or a signal in the SS block as the second downlink signal in QCL with the first port set for the first downlink signal.

In combination with the first aspect, in some implementation modes of the first aspect, the QCL ID may be the beam ID, and the operation that the UE determines the second downlink signal in QCL with the first port set for the first downlink signal based on the QCL ID may include the following operation.

The UE determines an SS block or downlink RS containing the beam ID as the second downlink signal in QCL with the first port set for the first downlink signal.

In combination with the first aspect, in some implementation modes of the first aspect, the QCL ID may be the RS ID configured to generate the sequence of the downlink RS, and the operation that the UE determines the second downlink signal in QCL with the first port set for the first downlink signal based on the QCL ID may include the following operation.

The UE determines the downlink RS of which the RS sequence is generated by use of the RS ID in a preconfigured RS set as the second downlink signal in QCL with the first port set for the first downlink signal.

In combination with the first aspect, in some implementation modes of the first aspect, that the first port set for the first downlink signal is in QCL with the second downlink signal may include the following conditions.

The UE may determine a large scale property of a channel corresponding to the first port set for the first downlink signal based on a large scale property of a channel for transmitting the second downlink signal; or the UE may determine a beam adopted to transmit or receive the signal on the first port set for the first downlink signal based on a beam adopted to transmit or receive the second downlink signal.

That is, the large scale property of the channel corresponding to the first port set configured to transmit the first downlink signal is similar to or the same as the large scale property of the channel configured to transmit the second downlink signal; or directions of the beam adopted to transmit or receive the signal on the first port set for the first downlink signal and the beam adopted to transmit or receive the second downlink signal are similar or the same.

In combination with the first aspect, in some implementation modes of the first aspect, the second downlink signal may be an SS block, and the condition that the UE may determine the large scale property of the channel corresponding to the first port set for the first downlink signal based on the large scale property of the channel for transmitting the second downlink signal may include the following condition.

The UE may determine the large scale property of the channel corresponding to the first port set for transmission of the first downlink signal based on a large scale property of a channel for transmitting an SS in the SS block or a DMRS of a Physical Broadcast Channel (PBCH).

In combination with the first aspect, in some implementation modes of the first aspect, the second downlink signal may be an SS block, and the condition that the UE may determine the beam adopted to transmit or receive the signal on the first port set for the first downlink signal based on the beam adopted to transmit or receive the second downlink signal may include the following condition.

The UE may determine the beam adopted to transmit or receive the signal on the first port set for the first downlink signal based on a beam adopted to transmit or receive an SS in the SS block or the PBCH.

In combination with the first aspect, in some implementation modes of the first aspect, the QCL information may include the large scale property of the channel or beam information.

In combination with the first aspect, in some implementation modes of the first aspect, the operation that the UE processes the signal on the first port set for the first downlink signal based on the QCL information obtained from the second downlink signal may include that: the UE acquires the large scale property of the channel for transmitting the second downlink signal; and channel estimation is performed on the channel corresponding to the first port set for the first downlink signal based on the large scale property of the channel for transmitting the second downlink signal.

In combination with the first aspect, in some implementation modes of the first aspect, the operation that the UE processes the signal on the first port set for the first downlink signal based on the QCL information obtained from the second downlink signal may include that: the UE determines the beam adopted to receive the second downlink signal as a target beam adopted to receive the signal on the first port set for the first downlink signal; and the target beam is adopted to receive the signal on the first port set for the first downlink signal.

That is, the UE, after determining the second downlink signal in QCL with the first port set for the first downlink signal, may execute a corresponding operation based on a signal type of the first downlink signal. For example, if the first downlink signal is a signal for cell synchronization such as an SS block, or an SS or a synchronization channel, the UE may perform cell synchronization based on the first downlink signal. Or if the first downlink signal is a DMRS, the UE may perform channel estimation on the channel corresponding to the first port set for the first downlink signal based on the large scale property of the channel for transmitting the second downlink signal, and may further perform data demodulation on the signal transmitted on the first port set based on a channel estimation result. Or if the first downlink signal is a Channel State Information-reference signal (CSI-RS), the UE may perform channel estimation on the channel corresponding to the first port set for the first downlink signal based on the large scale property of the channel for transmitting the second downlink signal, and may further perform Channel State Information (CSI) measurement based on a channel estimation result.

In combination with the first aspect, in some implementation modes of the first aspect, the large scale property of the channel may include at least one of: a delay spread, a doppler spread, a doppler shift, an average gain, an average delay, a departure of angle, an arrival of angle, correlation of receiving, or correlation of transmitting.

In combination with the first aspect, in some implementation modes of the first aspect, the first downlink signal may be a DMRS, or a CSI-RS, or an SS block, or an SS or a synchronization channel.

In combination with the first aspect, in some implementation modes of the first aspect, the second downlink signal may be a CSI-RS, an SS block, or an SS, or a synchronization channel or a Phase Tracking reference signal (PT-RS).

A second aspect provides a signal processing device, which includes units configured to execute the method in the first aspect or each implementation mode thereof.

A third aspect provides a signal processing device, which includes a memory, a processor and a transceiver. The memory is configured to store a program, the processor is configured to execute the program, and when the program is executed, the processor executes the method in the first aspect on the basis of the transceiver.

A fourth aspect provides a computer-readable medium, which stores a program code configured to be executed by UE, the program code including an instruction configured to execute the method in the first aspect.

DETAILED DESCRIPTION

The technical solutions in the embodiments of the application will be described below in combination with the drawings.

It is to be understood that the technical solutions of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an Advanced LTE (LTE-A) system, a Universal Mobile Telecommunication System (UMTS), or a 5th-Generation (5G) system.

Figure 1:
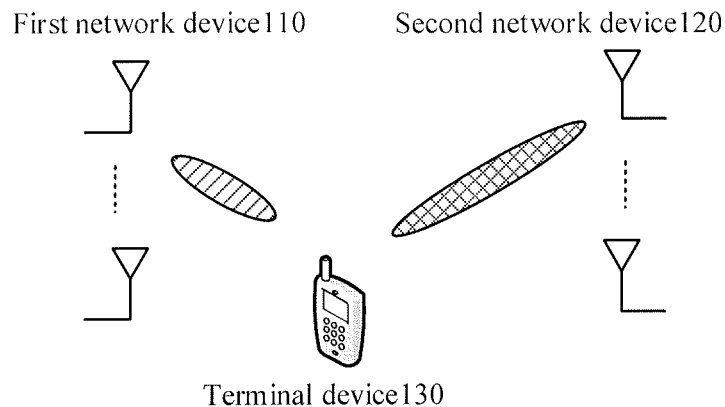
FIG. 1 illustrates a schematic diagram of a wireless communication system based on an embodiment of the application.

FIG. 1 illustrates a wireless communication system 100 applied to the embodiments of the disclosure. The wireless communication system 100 may include at least one network device, for example, a first network device 110 and second network device 120 illustrated in FIG. 1. Each of the first network device 110 and the second network device 120 may communicate with a terminal device 130 through an air interface. The first network device 110 and the second network device 120 may provide communication coverage for a specific geographical region and may communicate with the terminal device in the coverage. The first network device 110 or the second network device 120 may be a Base Transceiver Station (BTS) in the GSM or the CDMA system, or may be a NodeB in the WCDMA system, or may be an Evolutional Node B (eNB or eNodeB) in the LTE system, or a network device in a future 5G network, for example, a Transmission Reception Point (TRP), a base station and a small cell device. There are no special limits made thereto in the embodiments of the disclosure.

The wireless communication system 100 further includes one or more terminal devices 130 within the coverage of the first network device 110 and the second network device 120. The terminal device 130 may be mobile or fixed. The terminal device 130 may communicate with one or more core networks through a Radio Access Network (RAN). The terminal device may be called an access terminal, UE, a user unit, a user station, a mobile station, a mobile radio station, a remote station, a remote terminal, a mobile device, a user terminal, a terminal, a wireless communication device, a user agent or a user device. The terminal device may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network and the like.

Figure 2:
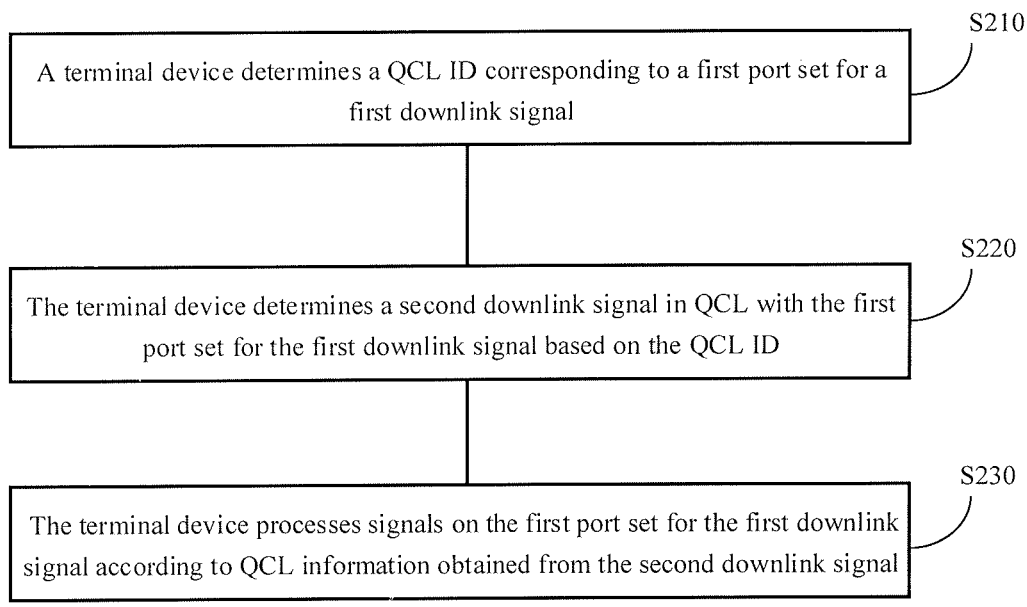
FIG. 2 illustrates a flowchart of a signal processing method based on an embodiment of the application.

FIG. 2 illustrates a flowchart of a signal processing method 200 based on an embodiment of the application. The method 200 may be executed by a terminal device in the wireless communication system illustrated in FIG. 1. As illustrated in FIG. 2, the method 200 includes the following actions.

In S210, the terminal device determines a QCL ID corresponding to a first port set for a first downlink signal.

In the embodiment of the application, the first downlink signal is a DMRS configured to demodulate a PBCH, or a CSI-RS, or an SS block, or an SS, or a synchronization channel or another downlink signal. There are no limits made thereto in the embodiment of the application.

Alternatively, if the first downlink signal is a DMRS, the DMRS may be a DMRS of a data channel, namely the DMRS may be used for correlation demodulation of the data channel, or the DMRS may be a DMRS of a control channel, namely the DMRS may be used for correlation demodulation of the control channel.

In the embodiment of the application, the first port set for the first downlink signal is in QCL, and the first port set includes part or all of ports configured to transmit the first downlink signal. For example, if the first downlink signal is a DMRS, and antenna ports for transmitting the DMRS include port 5, port 6, port 7 and port 8, the first port set for the DMRS may include part or all of port 5, port 6, port 7 and port 8. Or if the first downlink signal is a CSI-RS, and antenna ports configured to transmit the CSI-RS include port 0~port 3, the first port set for the CSI-RS includes part or all of port 0~port 3.

In specific implementation, it may be set that ports in the first port set correspond to the same QCL ID and ports in the first port set and other ports correspond to different QCL IDs respectively. For example, if the first downlink signal is a DMRS, antenna ports configured to transmit the DMRS include port 5, port 6, port 7 and port 8, and the first port set includes port 5 and port 6, namely port 5 is in QCL with port 6, and port 7 is in QCL with port 8, it may be set that port 5 and port 6 correspond to the same QCL ID, and port 7 and port 8 correspond to another QCL ID, so that the terminal device may determine which ports are in QCL based on the QCL IDs.

Alternatively, if the first port set for the first downlink signal is in QCL with a second port set for a second downlink signal, the first port set for the first downlink signal and the second port set for the second downlink signal may correspond to the same Q. Since a QCL ID may be used for multiple downlink signals, multiple downlink signals in QCL with the first downlink signal may be indicated through the QCL ID. Therefore, compared with an approach in which a network device configures index information of a downlink signal in QCL with the first downlink signal for the terminal device through high-layer signaling or Down Control Information (DCI), this approach has the advantages that a signaling overhead is reduced, and flexibility of a QCL indication manner is improved.

In the embodiment of the application, exemplarily but unlimitedly, the QCL ID may be a cell ID, a beam ID, or a time index of an SS block or an RS ID, namely the QCL ID may be a cell ID contained in an SS or an SS block, or the QCL ID may be a beam ID adopted to transmit or receive the downlink signal, and the QCL ID is an RS ID configured to generate an RS sequence. Of course, the QCL ID may also be other identification information. A specific identification manner for the QCL ID is not limited in the embodiment of the application.

In S220, the terminal device determines a second downlink signal in QCL with the first port set for the first downlink signal based on the QCL ID.

In a New Radio (NR) system, SS blocks are introduced for downlink synchronization. An SS block includes an SS, a PBCH, and a DMRS configured to demodulate the PBCH. An SS block may also be a downlink signal in QCL with the first downlink signal, so that the first downlink signal may be processed based on the SS block. For example, channel estimation may be performed on the first downlink signal based on the SS block, so that channel estimation performance of the first downlink signal is improved.

Therefore, in the embodiment of the application, the second downlink signal may be a CSI-RS, or an SS block, or an SS, or a synchronization channel, or a PT-RS or another downlink signal. There are no limits made thereto in the embodiment of the application.

In the embodiment of the application, the first port set for the first downlink signal being in QCL with the second downlink signal, may mean that the first port set for the first downlink signal is in QCL with the second port set for the second downlink signal. Alternatively, the first port set for the first downlink signal being in QCL with the second downlink signal may briefly mean that the first port set for the first signal is in QCL with all ports for the second signal. Alternatively, the first port set for the first downlink signal being in QCL with the second downlink signal may be expressed as that the first downlink signal is in QCL with the second downlink signal.

In the embodiment of the application, the first port set for the first downlink signal being in QCL with the second downlink signal may specifically include the following conditions.

The terminal device may determine a large scale property of a channel corresponding to the first port set for the first downlink signal based on a large scale property of a channel for transmitting the second downlink signal.

Or, the large scale property of the channel corresponding to the first port set configured to transmit the first downlink signal is similar to or the same as the large scale property of the channel configured to transmit the second downlink signal.

In the embodiment of the application, the meaning of the large scale property may be seen from a definition in the 3rd Generation Partnership Project (3GPP) standards, and may also be set based on a practical system requirement.

For example, the large scale property may include at least one of: a delay spread, a doppler spread, a doppler shift, an average gain, an average delay, a departure of angle, an arrival of angle, correlation of receiving, or correlation of transmitting. However, it is to be understood that the specific contents of the large scale property are listed herein only for exemplary description and should not form any limit to the disclosure and modifications or extensions to the contents in the large scale property in a future standard should not be ruled out in the disclosure.

In the embodiment of the application, the first port set for the first downlink signal being in QCL with the second downlink signal may further include the following conditions.

The terminal device may determine a beam adopted to transmit or receive a signal on the first port set for the first downlink signal based on a beam adopted to transmit or receive the second downlink signal.

Or, directions of the beam adopted to transmit or receive the signal on the first port set for the first downlink signal and the beam adopted to transmit or receive the second downlink signal are similar or the same.

Alternatively, in some embodiments, the second downlink signal is an SS block, and the operation that the terminal device may determine the large scale property of the channel corresponding to the first port set for the first downlink signal based on the large scale property of the channel for transmitting the second downlink signal may specifically include the following operation.

The terminal device may determine the large scale property of the channel corresponding to the first port set for transmission of the first downlink signal based on a large scale property of a channel for transmitting an SS in the SS block or a DMRS of a PBCH.

Alternatively, in some embodiments, the second downlink signal is an SS block, and the operation that the terminal device may determine the beam adopted to transmit or receive the signal on the first port set for the first downlink signal based on the beam adopted to transmit or receive the second downlink signal includes the following operation.

The terminal device may determine the beam adopted to transmit or receive the signal on the first port set for the first downlink signal based on a beam adopted to transmit or receive an SS in the SS block or the PBCH. The terminal device may determine the beam adopted to transmit or receive the signal on the first port set for the first downlink signal based on the beam adopted to transmit or receive the SS in the SS block or the PBCH. As described above, downlink signals in QCL correspond to the same QCL ID and the QCL ID may be a cell ID, a beam ID, a time index of an SS block or an RS ID, so that the terminal device may determine the second downlink signal in QCL with the first port set for the first downlink signal based on the cell ID, or the beam ID, or the time index of the SS block, or the RS ID.

Alternatively, as an embodiment, the QCL ID is the cell ID, and under this condition, S220 further includes the following operation.

The terminal device determines an SS block or a signal in the SS block containing the cell ID as the second downlink signal in QCL with the first port set for the first downlink signal.

Specifically, the terminal device may receive an SS block from at least one cell, and the SS block of each cell may include a cell ID corresponding to the cell. For example, the cell ID may be contained in a Secondary synchronization signal (SSS) in the SS block. Of course, the cell ID may also be contained in another SS in the SS block, or each signal in the SS block may contain the cell ID.

If the QCL ID corresponding to the first port set for the first downlink signal is a cell ID, the terminal device may determine the cell ID as a target cell ID, determine the SS block or the signal in the SS block containing the target cell ID in the SS block transmitted by the at least one cell, and determine the SS block or signal in the SS block containing the target cell ID as the second downlink signal in QCL with the first port set for the first downlink signal.

Furthermore, the terminal device may perform channel estimation on the channel corresponding to the first port set for transmission of the first downlink signal, namely performing channel estimation on the channel that the first port set for transmission of the first downlink signal passes through, based on a large scale property of a channel for transmitting the SS block, thereby improving the channel estimation performance of the first downlink signal.

Alternatively, in some embodiments, the QCL ID is the time index of the SS block, and the operation that the terminal device determines the second downlink signal in QCL with the first port set for the first downlink signal based on the QCL ID includes the following operation.

The terminal device determines an SS block containing the time index or a signal in the SS block as the second downlink signal in QCL with the first port set for the first downlink signal.

Specifically, the terminal device may receive an SS block transmitted by at least one cell, and the SS block of each cell may include a time index. For example, the time index may be contained in a PBCH in the SS block. Of course, the time index may also be contained in another SS in the SS block, or each signal in the SS block may contain the time index.

If the QCL ID corresponding to the first port set for the first downlink signal is a time index of an SS block, the terminal device may determine the time index as a target time index, determine the SS block or the signal in the SS block containing the target time index in the SS block transmitted by the at least one cell, and determine the SS block or signal in the SS block containing the target time index as the second downlink signal in QCL with the first port set for the first downlink signal.

Alternatively, as another embodiment, the QCL ID is the beam ID, and the operation that the terminal device determines the second downlink signal in QCL with the first port set for the first downlink signal based on the QCL ID includes the following operation.

The terminal device determines an SS block or downlink RS containing the beam ID as the second downlink signal in QCL with the first port set for the first downlink signal.

Specifically, the terminal device may receive an SS block transmitted by at least one cell, and the SS block of each cell may include a beam ID configured to transmit or receive the SS block. For example, the beam ID may be contained in any signal in the SS block. For example, the beam ID may be contained in an SSS in the SS block, or may be contained in another SS in the SS block, or each signal in the SS block may contain the beam ID.

If the QCL ID corresponding to the first port set for the first downlink signal is a beam ID, the terminal device may determine the beam ID as a target beam ID, determine the SS block containing the target beam ID from the SS block transmitted by the at least one cell, and determine the SS block containing the target beam ID as the second downlink signal in QCL with the first port set for the first downlink signal.

The terminal device may also adopt a similar manner to determine the downlink RS in QCL with the first port set for the first downlink signal based on the beam ID, and then determine the downlink RS as the second downlink signal.

Furthermore, the terminal device may perform channel estimation on the channel corresponding to the first port set for transmission of the first downlink signal, namely performing channel estimation on the channel that the first port set for transmission of the first downlink signal passes through, based on a large scale property of a channel for transmitting the SS block or the downlink RS, thereby improving the channel estimation performance of the first downlink signal.

Alternatively, as another embodiment, the QCL ID is the RS ID configured to generate the sequence of the downlink RS, and under this condition, S220 further includes the following operation.

The terminal device determines the downlink RS, of which a RS sequence is generated by use of the RS ID, in a pre-configured RS set, as the second downlink signal in QCL with the first port set for the first downlink signal.

Specifically, the network device may pre-configure an RS set for the terminal device, for each RS in the RS set, a respective RS sequence is generated by use of an RS ID. If the QCL ID is the RS ID configured to generate the sequence of the downlink RS, the terminal device may record the RS ID as a target RS ID, and determine, based on the target RS ID, an RS of which the sequence is generated by use of the target RS ID in the RS set, thereby determining the RS as the second downlink signal in QCL with the first port set for the first downlink signal.

Furthermore, the terminal device may perform channel estimation on the channel corresponding to the first port set for the first downlink signal based on the large scale property of the channel for transmitting the second downlink signal, thereby improving the channel estimation performance of the first downlink signal.

In S230, the terminal device processes signals on the first port set for the first downlink signal based on QCL information obtained from the second downlink signal.

It is to be understood that, in the embodiment of the application, the second downlink signal may include at least one downlink signal. For example, the second downlink signal may include at least one of the abovementioned types of second downlink signals. That is, the terminal device may process the signals on the first port set for the first downlink signal based on the QCL information obtained from the at least one downlink signal.

In the embodiment of the application, the QCL information may include large scale information of the channel or beam information. Specifically, the QCL information of the second downlink signal may include the large scale property of the channel configured to transmit the second downlink signal or the beam information of the beam adopted to transmit or receive the second downlink signal.

For example, if the first downlink signal is a DMRS, and the signal transmitted on the first port set for the first downlink signal is a DMRS, the terminal device may perform channel estimation on the channel corresponding to the first port set for the first downlink signal based on the QCL information obtained from the second downlink signal, and perform data demodulation on the signal on the first port set based on a channel estimation result. For another example, if the first downlink signal is a CSI-RS, and the signal transmitted on the first port set for the first downlink signal is a CSI-RS, the terminal device may perform channel estimation on the channel corresponding to the first port set for the first downlink signal based on the QCL information obtained from the second downlink signal, and perform CSI measurement based on a channel estimation result. For another example, if the first downlink signal is an SS, and the signal transmitted on the first port set for the first downlink signal is an SS, the terminal device may receive signals on the first port set for the first downlink signal based on the QCL information obtained from the second downlink signal, and may further acquire synchronization information based on the SS.

Alternatively, as an embodiment, S230 may further include the following operations.

The terminal device acquires the large scale property of the channel for transmitting the second downlink signal.

Channel estimation is performed on the channel corresponding to the first port set for the first downlink signal based on the large scale property of the channel for transmitting the second downlink signal.

As described above, under the condition that the first port set for the first downlink signal is in QCL with the second downlink signal, the large scale property of the channel corresponding to the first port set configured to transmit the first downlink signal is similar to or the same as the large scale property configured to transmit the second downlink signal. Therefore, the terminal device may perform channel estimation on the channel corresponding to the first port set for the first downlink signal based on the large scale property of the channel for transmitting the second downlink signal.

For example, if the first downlink signal is a DMRS of a data channel and the second downlink signal is a CSI-RS, the terminal device may perform channel estimation on the channel corresponding to the first port set for the DMRS of the data channel based on the large scale property such as the delay spread or the doppler spread obtained by channel estimation over the channel for transmitting the CSI-RS. Furthermore, the terminal device may perform data demodulation on the first port set based on a channel estimation result.

For another example, if the first downlink signal is a CSI-RS, and the second downlink signal is a PT-RS, the terminal device may perform channel estimation on the channel corresponding to the first port set for the CSI-RS based on the large scale property, such as the delay spread or the doppler spread obtained by channel estimation over the channel for transmitting the PT-RS. Furthermore, the terminal device may perform CSI measurement based on a channel estimation result.

In the embodiment of the application, if the first downlink signal is an SS block, or an SS or a synchronization channel, the terminal device may merely need to receive an SS block, or SS or synchronization channel on the first port set for the first downlink signal, and then perform cell signal synchronization based on the received SS block, or SS or synchronization channel on the first port set for the first downlink signal, and does not need to execute a channel estimation related operation.

That is, the terminal device, after determining the second downlink signal in QCL with the first port set for the first downlink signal, may execute an operation corresponding to a signal type of the first downlink signal. For example, if the first downlink signal is a signal for cell synchronization such as an SS block, or an SS or a synchronization channel, the terminal device may perform cell synchronization based on the first downlink signal. Or if the first downlink signal is a DMRS, the terminal device may perform channel estimation on the channel corresponding to the first port set for the first downlink signal based on the large scale property of the channel for transmitting the second downlink signal, and may further perform data demodulation on the first port set based on a channel estimation result. Or if the first downlink signal is a CSI-RS, the terminal device may perform channel estimation on the channel corresponding to the first port set for the first downlink signal based on the large scale property of the channel for transmitting the second downlink signal, and may further perform CSI measurement based on a channel estimation result.

Alternatively, as another embodiment, S230 may further include the following operations.

The terminal device determines the beam adopted to receive the second downlink signal as a target beam adopted to receive the signal on the first port set for the first downlink signal.

The terminal device adopts the target beam to receive the signal on the first port set for the first downlink signal.

As described above, under the condition that the first port set for the first downlink signal is in QCL with the second downlink signal, the directions of the beam adopted to transmit or receive the signal on the first port set for the first downlink signal and the beam adopted to transmit or receive the second downlink signal are similar or the same. Therefore, the terminal device may determine the beam configured to receive the second downlink signal as the target beam for receiving the signal on the first port set for the first downlink signal, and then adopt the target beam to receive the signal on the first port set for the first downlink signal.

For example, if the first downlink signal is a DMRS of a data channel and the second downlink signal is a CSI-RS, the terminal device may determine the beam receiving the CSI-RS as the target beam receiving the signal on the first port set for the DMRS of the data channel and adopt the target beam to receive the signal on the first port set for the DMRS of the data channel.

In such a manner, based on the signal processing method of the embodiment of the application, the terminal device may determine the second downlink signal in QCL with the first downlink signal based on the QCL ID, and process the signal on the first port set for the first downlink signal based on the second downlink signal. For example, channel estimation may be performed on the signal on the first port set for the first downlink signal based on the second downlink signal, thereby improving the channel estimation performance of the first downlink signal.

The method embodiment of the application is described above in combination with FIG. 2 in detail and a device embodiment of the application will be described below in combination with FIG. 3 and FIG. 4 in detail. It is to be understood that the device embodiment corresponds to the method embodiment and similar descriptions may refer to the method embodiment.

Figure 3:
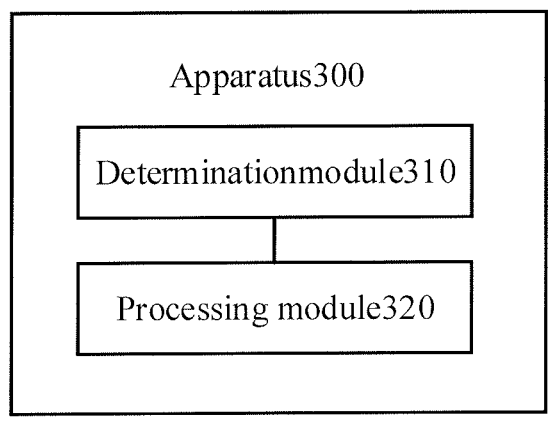
FIG. 3 illustrates a block diagram of a signal processing device based on an embodiment of the application.

FIG. 3 illustrates a block diagram of a signal processing device based on an embodiment of the application. The apparatus 300 illustrated in FIG. 3 includes a determination module 310 and a processing module 320.

The determination module 310 is configured to determine a QCL ID corresponding to a first port set for a first downlink signal and determine a second downlink signal in QCL with the first port set for the first downlink signal based on the QCL ID.

The processing module 320 is configured to process signals on the first port set for the first downlink signal based on QCL information obtained from the second downlink signal.

Alternatively, in some embodiments, the QCL ID is a cell ID, or a beam ID, or a time index of an SS block, or an RS ID configured to generate a sequence of a downlink RS.

Alternatively, in some embodiments, the first port set includes part or all of ports for the first downlink signal.

Alternatively, in some embodiments, the QCL ID is the cell ID, and the determination module 310 is specifically configured to determine an SS block or a signal in the SS block containing the cell ID as the second downlink signal in QCL with the first port set for the first downlink signal.

Alternatively, in some embodiments, the QCL ID is the time index of the SS block, and the determination module 310 is specifically configured to determine an SS block or a signal in the SS block containing the time index as the second downlink signal in QCL with the first port set for the first downlink signal.

Alternatively, in some embodiments, the QCL ID is the beam ID, and the determination module 310 is specifically configured to determine an SS block or downlink RS containing the beam ID as the second downlink signal in QCL with the first port set for the first downlink signal.

Alternatively, in some embodiments, the QCL ID is the RS ID configured to generate the sequence of the downlink RS, and the determination module 310 is specifically configured to determine, in a pre-configured RS set, the downlink RS of which the RS sequence is generated by use of the RS ID, as the second downlink signal in QCL with the first port set for the first downlink signal.

Alternatively, in some embodiments, the condition that the first port set for the first downlink signal is in QCL with the second downlink signal includes that, the determination module 310 may determine a large scale property of a channel corresponding to the first port set for the first downlink signal based on a large scale property of a channel for transmitting the second downlink signal; or the determination module 310 may determine a beam adopted to transmit or receive a signal on the first port set for the first downlink signal based on a beam adopted to transmit or receive the second downlink signal.

Alternatively, in some embodiments, the second downlink signal is an SS block, and the condition that the determination module 310 may determine the large scale property of the channel corresponding to the first port set for the first downlink signal based on the large scale property of the channel for transmitting the second downlink signal includes that, the determination module 310 may determine the large scale property of the channel corresponding to the first port set for transmission of the first downlink signal based on a large scale property of a channel for transmitting an SS in the SS block or a DMRS of a PBCH.

Alternatively, in some embodiments, the second downlink signal is an SS block, and the condition that the determination module 310 may determine the beam adopted to transmit or receive the signal on the first port set for the first downlink signal based on the beam adopted to transmit or receive the second downlink signal includes that, the determination module 310 may determine the beam adopted to transmit or receive the signal on the first port set for the first downlink signal based on a beam adopted to transmit or receive an SS in the SS block or the PBCH.

Alternatively, in some embodiments, the QCL information includes the large scale property of the channel or beam information.

Alternatively, in some embodiments, the processing module 320 is specifically configured to acquire the large scale property of the channel for transmitting the second downlink signal; and receive the signal on the first port set for the first downlink signal based on the large scale property of the channel for transmitting the second downlink signal.

Alternatively, in some embodiments, the processing module 320 is specifically configured to determine the beam adopted to receive the second downlink signal as a target beam adopted to receive the signal on the first port set for the first downlink signal.

The apparatus 300 further includes a communication module.

The communication module is configured to adopt the target beam to receive the signal on the first port set for the first downlink signal.

Alternatively, in some embodiments, the large scale property of the channel includes at least one of a delay spread, a doppler spread, a doppler shift, an average gain, an average delay, a departure of angle, an arrival of angle, correlation of receiving, or correlation of transmitting.

Alternatively, in some embodiments, the first downlink signal is a DMRS, or a CSI-RS, or an SS block, or an SS, or a synchronization channel.

Alternatively, in some embodiments, the second downlink signal is a CSI-RS, an SS block, or an SS, or a synchronization channel, or a PT-RS.

Specifically, the apparatus 300 may correspond to (for example, configured in or is) the terminal device described in the method 200, and moreover, each module or unit in the apparatus 300 is configured to execute each operation or processing process executed by the terminal device in the method 200. For avoiding elaborations, detailed descriptions will be omitted herein.

Figure 4:
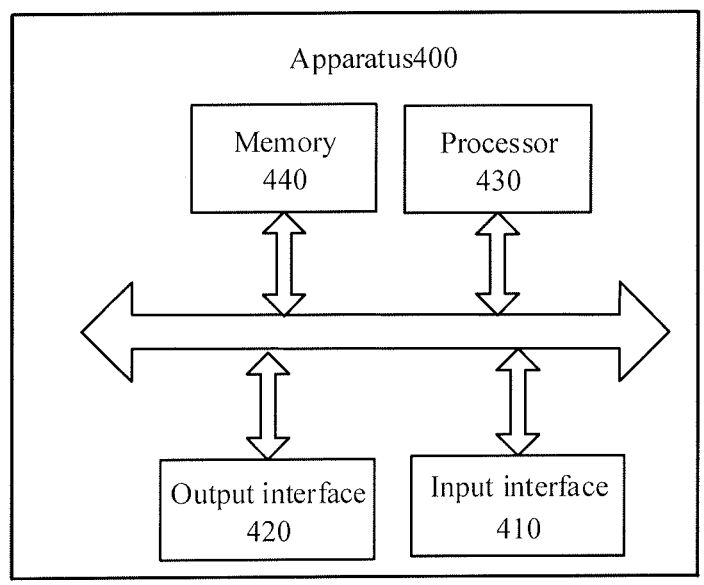
FIG. 4 illustrates a block diagram of a signal processing device based on another embodiment of the application.

As illustrated in FIG. 4, an embodiment of the application also provides a signal processing apparatus 400. The apparatus 400 may be the apparatus 300 in FIG. 3, and may be configured to execute operations of the terminal device corresponding to the method 200 in FIG. 2. The apparatus 400 includes an input interface 410, an output interface 420, a processor 430 and a memory 440. The input interface 410, the output interface 420, the processor 430 and the memory 440 may be connected through a bus system. The memory 440 is configured to store a program, instructions or a code. The processor 430 is configured to execute the program instructions or code in the memory 440 to control the input interface 410 to receive a signal, control the output interface 420 to transmit a signal and complete operations in the method embodiments.

It is to be understood that, in the embodiment of the application, the processor 430 may be a Central Processing Unit (CPU) and the processor 430 may also be another universal processor, a Digital Signal Processor (DSP), an Application Specific Integrated Circuit (ASIC), an Field Programmable Gate Array (FPGA) or another programmable logic device, discrete gate or transistor logic device and discrete hardware component and the like. The universal processor may be a microprocessor or the processor may also be any conventional processor and the like.

The memory 440 may include a Read-Only Memory (ROM) and a Random Access Memory (RAM) and provides an instruction and data for the processor 430. A part of the memory 440 may further include a nonvolatile RAM. For example, the memory 440 may further store information of a device type.

In an implementation process, each content of the method may be completed by an integrated logic circuit of hardware in the processor 430 or an instruction in a software form. The contents of the method disclosed in combination with the embodiments of the application may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 440. The processor 430 reads information in the memory 440 and completes the contents of the method in combination with hardware. No more detailed descriptions will be made herein to avoid repetitions.

In a specific implementation mode, the determination module 320, processing module 320 and acquisition module of the apparatus 300 in FIG. 3 may be implemented by the processor 430 in FIG. 4, and the communication module of the apparatus 300 in FIG. 3 may be implemented by the input interface 410 and output interface 420 in FIG. 4.

An embodiment of the application also discloses a computer-readable storage medium, which stores one or more programs, the one or more programs including instructions and the instructions being executed by a portable electronic device including multiple application programs to enable the portable electronic device to execute the method of the embodiment illustrated in FIG. 2.

An embodiment of the application also discloses a computer program, which includes an instruction, the computer program being executed by a computer to enable the computer to execute corresponding flows in the method of the embodiment illustrated in FIG. 2.

Those of ordinary skill in the art may realize that the units and algorithm actions of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments based on a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the actions of the method in each embodiment of the application. The abovementioned storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A signal processing method, comprising:
   determining, by a terminal device, a Cell identifier (ID) corresponding to a first port set for a first downlink signal;
   determining, by the terminal device, a second downlink signal in Quasi-Co-Location (QCL) with the first port set for the first downlink signal based on the Cell ID; and
   processing, by the terminal device, signals on the first port set for the first downlink signal based on QCL information obtained from the second downlink signal;
   wherein determining, by the terminal device, the second downlink signal in QCL with the first port set for the first downlink signal based on the Cell ID, comprises:
   determining, by the terminal device, a synchronization signal (SS) block or a signal in the SS block containing the cell ID as the second downlink signal in QCL with the first port set for the first downlink signal;
   the QCL information comprises a large scale property of a channel, the large scale property of the channel comprising a doppler shift or an average delay;
   wherein processing, by the terminal device, the signal on the first port set for the first downlink signal based on the QCL information obtained from the second downlink signal comprises:
   acquiring, by the terminal device, a large scale property of a channel for transmitting the second downlink signal; and
   performing, by the terminal device, channel estimation on a channel corresponding to the first port set for the first downlink signal based on the large scale property of the channel for transmitting the second downlink signal.

2. The method of claim 1, wherein the large scale property of the channel for transmitting the second downlink signal is used to determine a large scale property of the channel corresponding to the first port set for the first downlink signal; or
   a beam adopted to transmit or receive the second downlink signal is used to determine a beam adopted to transmit or receive the signal on the first port set for the first downlink signal.

3. The method of claim 2, wherein a large scale property of a channel for transmitting an SS in the SS block or a demodulation reference signal (DMRS) of a physical broadcast channel (PBCH) is used to determine the large scale property of the channel corresponding to the first port set for transmission of the first downlink signal.

4. The method of claim 2, wherein the second downlink signal is an SS block, and
   a beam adopted to transmit or receive an SS in the SS block or a PBCH is used to determine the beam adopted to transmit or receive the signal on the first port set for the first downlink signal.

5. The method of claim 1, wherein the QCL information further comprises beam information.

6. The method of claim 5, wherein processing, by the terminal device, the signals on the first port set for the first downlink signal based on the QCL information obtained from the second downlink signal comprises:
   determining, by the terminal device, a beam adopted to receive the second downlink signal as a target beam adopted to receive the signal on the first port set for the first downlink signal; and
   adopting the target beam to receive the signals on the first port set for the first downlink signal.

7. The method of claim 5, wherein the large scale property of the channel comprises at least one of:
   a delay spread, a doppler spread, an average gain, a departure of angle, an arrival of angle, correlation of receiving, or correlation of transmitting.

8. The method of claim 1, wherein the first port set comprises part or all of ports for the first downlink signal.

9. A signal processing apparatus, comprising:
   a processor, configured to:
   determine a Cell identifier (ID) corresponding to a first port set for a first downlink signal;
   determine a second downlink signal in Quasi-Co-Location (QCL) with the first port set for the first downlink signal based on the Cell ID;
   process signals on the first port set for the first downlink signal based on QCL information obtained from the second downlink signal;
   wherein the processor is further configured to:
   determine a synchronization signal (SS) block or a signal in the SS block containing the Cell ID as the second downlink signal in QCL with the first port set for the first downlink signal;
   the QCL information comprises a large scale property of a channel, the large scale property of the channel comprising a doppler shift or an average delay;
   wherein the processing module (320) is further configured to acquire a large scale property of a channel for transmitting the second downlink signal; and perform channel estimation on a channel corresponding to the first port set for the first downlink signal based on the large scale property of the channel for transmitting the second downlink signal.

10. The apparatus of claim 9, wherein the large scale property of the channel for transmitting the second downlink signal is used to determine a large scale property of the channel corresponding to the first port set for the first downlink signal; or
    a beam adopted to transmit or receive the second downlink signal is used to determine a beam adopted to transmit or receive the signal on the first port set for the first downlink signal.

11. The apparatus of claim 10, wherein a large scale property of a channel for transmitting an SS in the SS block or a demodulation reference signal (DMRS) of a physical broadcast channel (PBCH) is used to determine the large scale property of the channel corresponding to the first port set for transmission of the first downlink signal.

12. The apparatus of claim 10, wherein the second downlink signal is an SS block, and
 a beam adopted to transmit or receive an SS in the SS block or a PBCH is used to determine the beam adopted to transmit or receive the signal on the first port set for the first downlink signal.

13. The apparatus of claim 9, wherein the QCL information further comprises beam information.

14. The apparatus of claim 9, wherein the processor is specifically configured to:
 determine a beam adopted to receive the second downlink signal as a target beam adopted to receive the signal on the first port set for the first downlink signal; and
 the apparatus further comprises:
 an input interface, configured to adopt the target beam to receive the signal on the first port set for the first downlink signal.

15. The apparatus of claim 9, wherein the large scale property of the channel comprises at least one of:
 a delay spread, a doppler spread, an average gain, a departure of angle, an arrival of angle, correlation of receiving, or correlation of transmitting.

16. The apparatus of claim 9, wherein the first port set comprises part or all of ports for the first downlink signal.

* * * * *